(12) United States Patent
Okano et al.

(10) Patent No.: US 12,506,197 B2
(45) Date of Patent: Dec. 23, 2025

(54) OUTER PACKAGE MATERIAL FOR ALL-SOLID-STATE BATTERIES, METHOD FOR PRODUCING SAME AND ALL-SOLID-STATE BATTERY

(71) Applicant: DAI NIPPON PRINTING CO., LTD., Tokyo (JP)

(72) Inventors: Ai Okano, Tokyo (JP); Miho Sasaki, Tokyo (JP); Kazufumi Kodani, Tokyo (JP); Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 595 days.

(21) Appl. No.: 17/910,586

(22) PCT Filed: Mar. 12, 2021

(86) PCT No.: PCT/JP2021/010154
§ 371 (c)(1),
(2) Date: Sep. 9, 2022

(87) PCT Pub. No.: WO2021/182622
PCT Pub. Date: Sep. 16, 2021

(65) Prior Publication Data
US 2023/0198059 A1    Jun. 22, 2023

(30) Foreign Application Priority Data
Mar. 12, 2020   (JP) .................. 2020-043560

(51) Int. Cl.
*H01M 50/121*   (2021.01)
*H01M 10/052*   (2010.01)
(Continued)

(52) U.S. Cl.
CPC ....... *H01M 50/121* (2021.01); *H01M 10/052* (2013.01); *H01M 10/058* (2013.01); *H01M 50/136* (2021.01)

(58) Field of Classification Search
CPC ............. H01M 50/121; H01M 50/136; H01M 50/105; H01M 50/119; H01M 50/1243;
(Continued)

(56) References Cited

U.S. PATENT DOCUMENTS

| 9,941,493 B2 | 4/2018 | Taniguchi et al. |
| 2017/0279113 A1 | 9/2017 | Ohsawa et al. |

(Continued)

FOREIGN PATENT DOCUMENTS

| CN | 106797046 A | 5/2017 |
| EP | 1 640 152 B1 | 12/2018 |

(Continued)

OTHER PUBLICATIONS

English Translation of JP-2016186872-A (Year: 2016).*
(Continued)

*Primary Examiner* — Niki Bakhtiari
*Assistant Examiner* — Madison Leigh Kyle
(74) *Attorney, Agent, or Firm* — Oliff PLC

(57) ABSTRACT

A outer package material for all-solid-state batteries, said outer package material being composed of a multilayer body that is sequentially provided, from the outer side, with at least a base material layer, a barrier layer and a thermally fusible resin layer in this order, while exhibiting excellent insulating performance in a high temperature environment and excellent followability to the expansion and contraction of a solid electrolyte during charging and discharging of an all-solid-state battery. An outer package material for all-solid-state batteries, said outer package material being composed of a multilayer body that is sequentially provided, (Continued)

from the outer side, with at least a base material layer, a barrier layer and a thermally fusible resin layer in this order, wherein the thermally fusible resin layer is formed of a polybutylene terephthalate film that contains an elastomer.

11 Claims, 3 Drawing Sheets

(51) Int. Cl.
  *H01M 10/058* (2010.01)
  *H01M 50/136* (2021.01)
(58) Field of Classification Search
  CPC ............. H01M 50/129; H01M 10/052; H01M 10/058; H01M 10/0413; H01M 10/0562; H01M 2300/0065; Y02E 60/10
  See application file for complete search history.

(56) References Cited

U.S. PATENT DOCUMENTS

| | | | |
|---|---|---|---|
| 2018/0076423 | A1 | 3/2018 | Kokuryo et al. |
| 2019/0157633 | A1 | 5/2019 | Ojiri et al. |
| 2021/0057683 | A1 | 2/2021 | Sasaki et al. |

FOREIGN PATENT DOCUMENTS

| | | |
|---|---|---|
| JP | 2008-103288 A | 5/2008 |
| JP | 2012-142228 A | 7/2012 |
| JP | 2014-049204 A | 3/2014 |
| JP | 2016-072161 A | 5/2016 |
| JP | 2016-186872 A | 10/2016 |
| KR | 101987893 B1 | 6/2019 |
| WO | 2020/004413 A1 | 1/2020 |

OTHER PUBLICATIONS

English Translation of WO-2020004413-A1) (Year: 2020).*
Jan. 20, 2025 extended Search Report issued in European Patent Application No. 21767981.0.
Jun. 8, 2021 International Search Report issued in Patent Application No. PCT/JP2021/010154.
Jun. 1, 26, 2025 Office Action issued in Korean Patent Application No. 10-2022-7021058.

* cited by examiner

OUTER PACKAGE MATERIAL FOR ALL-SOLID-STATE BATTERIES, METHOD FOR PRODUCING SAME AND ALL-SOLID-STATE BATTERY

TECHNICAL FIELD

The present disclosure relates to an exterior material for an all-solid-state battery, a method for producing the exterior material for an all-solid-state battery, and an all-solid-state battery.

BACKGROUND ART

Various types of electrical storage devices have been heretofore developed, and for example, lithium ion batteries are used in a wide range of fields.

In every electrical storage device, a packaging material (exterior material) is an essential member for sealing electrical storage device elements such as an electrode and an electrolyte, and for example, a lithium ion battery has an electrolytic solution sealed by an exterior material.

An electrical storage device containing an electrolytic solution like a lithium ion battery cannot be used in an environment at a temperature equal to or higher than the boiling point of the electrolytic solution. On the other hand, an all-solid-state battery having a solid electrolyte as an electrolyte is known. The all-solid-state battery has the advantages of high safety and a wide operating temperature range because an organic solvent is not used in the battery.

PRIOR ART DOCUMENTS

Patent Documents

Patent Document 1: Japanese Patent Laid-open Publication No. 2012-142228
Patent Document 2: Japanese Patent Laid-open Publication No. 2008-103288

SUMMARY OF THE INVENTION

Problems to be Solved by the Invention

As described above, an all-solid-state battery has a solid electrolyte, and therefore can be charged at a higher speed at a high temperature as compared to an electrical storage device using an electrolytic solution, and used in an environment at a higher temperature as compared with a lithium ion battery or the like.

An exterior material including a laminated film with a base material layer, a barrier layer, and a heat-sealable resin layer laminated in this order is known as an exterior material for electrical storage devices which is easily processed into diversified shapes and is capable of achieving thickness reduction and weight reduction.

When an exterior material including such a laminated film is used for an all-solid-state battery, the exterior material is also required to have durability in a high-temperature environment. Specifically, in an exterior material used for an all-solid-state battery, it is desirable that a heat-sealable resin layer have high insulation quality in a high-temperature environment.

However, in an exterior material including a laminated film, a heat-sealable resin layer is generally formed of polyolefin such as polypropylene, and there is a problem that it is difficult to exhibit high insulation quality in a high-temperature environment at, for example, 100° C. or higher.

In addition, an all-solid-state battery has a characteristic such that a solid electrolyte undergoes volume expansion during charge. Thus, for the all-solid-state battery, the property that if the solid electrolyte undergoes volume expansion during charge, an exterior material follows a shape change associated with the volume expansion, and durability of the exterior material against the shape change associated with the volume expansion are required.

Under these circumstances, a main object of the present disclosure is to provide an exterior material for an all-solid-state battery which includes a laminate including at least a base material layer, a barrier layer, and a heat-sealable resin layer in this order from outside and which has excellent insulation quality in a high-temperature environment and excellent followability to expansion and contraction of a solid electrolyte during charge-discharge of the all-solid-state battery.

Means for Solving the Problem

The inventors of the present disclosure have extensively conducted studies for achieving the above-described object. As a result, the inventors have found that in an exterior material for an all-solid-state battery which includes a laminate including at least a base material layer, a barrier layer, and a heat-sealable resin layer in this order from outside, the heat-sealable resin layer being formed of a polybutylene terephthalate film containing an elastomer, the heat-sealable resin layer has high insulation quality, and excellent followability to expansion and contraction of a solid electrolyte during charge-discharge of the all-solid-state battery is exhibited.

The present disclosure has been completed by further conducting studies based on the above-mentioned findings. That is, the present disclosure provides an invention of an aspect as described below.

An exterior material for an all-solid-state battery, including a laminate including at least a base material layer, a barrier layer, and a heat-sealable resin layer in this order from outside, the heat-sealable resin layer being formed of a polybutylene terephthalate film containing an elastomer.

Advantages of the Invention

According to the present disclosure, it is possible to provide an exterior material for an all-solid-state battery which includes a laminate including at least a base material layer, a barrier layer, and a heat-sealable resin layer in this order from outside and which has excellent insulation quality in a high-temperature environment and excellent followability to expansion and contraction of a solid electrolyte during charge-discharge of the all-solid-state battery. According to the present disclosure, it is also possible to provide a method for producing an exterior material for an all-solid-state battery, and an all-solid-state battery.

EMBODIMENTS OF THE INVENTION

An exterior material for an all-solid-state battery according to the present disclosure includes a laminate including at least a base material layer, a barrier layer, and a heat-sealable resin layer in this order from outside, the heat-sealable resin layer being formed of a polybutylene terephthalate film containing an elastomer. The exterior material for an all-solid-state battery according to the present disclosure, which has the above-mentioned configuration, is excellent in insulation quality in a high-temperature environment and has excellent followability to expansion and contraction of a solid electrolyte during charge-discharge of the all-solid-state battery due to the configuration.

Hereinafter, the exterior material for an all-solid-state battery according to the present disclosure will be described in detail. In this specification, a numerical range indicated by the term "A to B" means "A or more" and "B or less". For example, the expression of "2 to 15 mm" means 2 mm or more and 15 mm or less.

Figure 4:
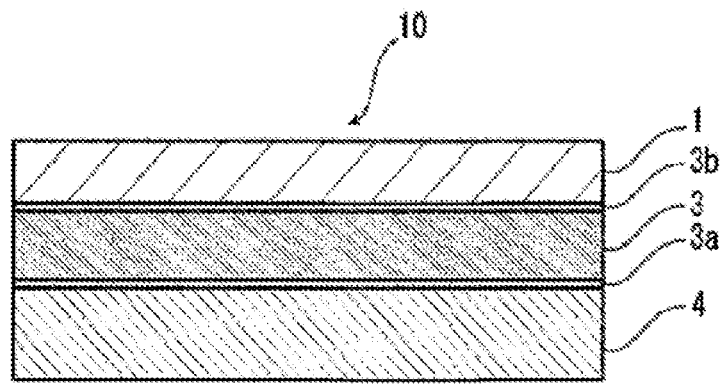
FIG. 4 is a schematic cross-sectional view showing an example of a laminated structure of an exterior material for an all-solid-state battery according to the present disclosure.

1. Laminated Structure and Physical Properties of Exterior Material for all-Solid-State Battery As shown in, for example, FIGS. 4 to 6, an exterior material 10 for an all-solid-state battery according to the present disclosure (hereinafter, sometimes referred to as an "exterior material 10) includes a laminate including at least a base material layer 1, a barrier layer 3 and a heat-sealable resin layer 4 in this order. In the exterior material 10, the base material layer 1 is on the outer layer side, and the heat-sealable resin layer 4 is on the inner layer side. In construction of the all-solid-state battery using the exterior material 10 and battery elements, the battery elements are housed in a space formed by heat-sealing the peripheral portions of the heat-sealable resin layers 4 of the exterior material 10 which face each other.

Figure 5:
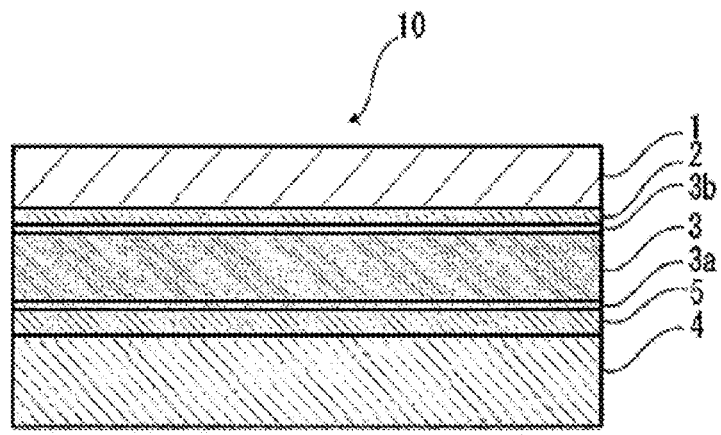
FIG. 5 is a schematic cross-sectional view showing an example of a laminated structure of an exterior material for an all-solid-state battery according to the present disclosure.
Figure 6:
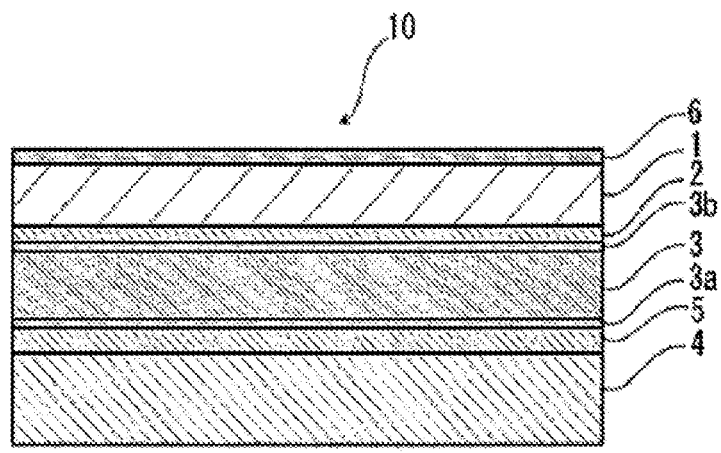
FIG. 6 is a schematic cross-sectional view showing an example of a laminated structure of an exterior material for an all-solid-state battery according to the present disclosure.

As shown in, for example, FIG. 5, the exterior material 10 for an all-solid-state battery may have an adhesive agent layer 2 between the base material layer 1 and the barrier layer 3 if necessary for the purpose of, for example, improving bondability between these layers. As shown in, for example, FIG. 5, an adhesive layer 5 may be present between the barrier layer 3 and the heat-sealable resin layer 4 if necessary for the purpose of, for example, improving bondability between these layers. As shown in FIG. 6, a surface coating layer 6 or the like may be provided on the outside of the base material layer 1 (on a side opposite to the heat-sealable resin layer 4 side) if necessary.

The thickness of the laminate forming the exterior material 10 for an all-solid-state battery is not particularly limited, and is preferably about 10,000 µm or less, about 8,000 µm or less, or about 5,000 µm or less from the viewpoint of cost reduction, improvement of the energy density and the like, and preferably about 100 µm or more, about 150 µm or more, or about 200 µm or more from the viewpoint of maintaining the function of the exterior material 10 for an all-solid-state battery of protecting a battery element. The thickness of the laminate is preferably, in the range of, for example, about 100 to 10,000 µm, about 100 to 8,000 µm, about 100 to 5,000 µm, about 150 to 10,000 µm, about 150 to 8,000 µm, about 150 to 5,000 µm, about 200 to 10,000 µm, about 200 to 8,000 µm, or about 200 to 5,000 µm, and particularly preferably about 100 to 500 µm.

Details of the layers forming the exterior material 10 for an all-solid-state battery will be described in the section "3. Layers forming exterior material for an all-solid-state battery".

From the viewpoint of further improving the insulation quality and the followability of the exterior material 10 for an all-solid-state battery in a high-temperature environment, the tensile rupture elongation of the laminate forming the exterior material 10 for an all-solid-state battery in an environment at 120° C. is preferably about 300% or more, more preferably about 350% or more, still more preferably about 400% or more in at least one of directions perpendicular to a direction along the thickness of the laminate. From the same viewpoint, the tensile rupture elongation is preferably about 1000% or less, more preferably about 900% or less, still more preferably about 800% or less. The tensile rupture elongation is preferably in the range of about 300 to 1000, about 300 to 900%, about 300 to 800%, about 350 to 1000%, about 350 to 900%, about 350 to 800%, about 400 to 1000%, about 400 to 900%, or about 400 to 800%. The tensile rupture elongation of the laminate forming the exterior material 10 for an all-solid-state battery in an environment at 23° C. is preferably about 350% or more, more preferably about 400% or more, still more preferably about 450% or more. From the same viewpoint, the tensile rupture elongation is preferably about 1000% or less, more preferably about 900% or less, still more preferably about 800% or less. The tensile rupture elongation is preferably in the range of about 350 to 1000%, about 350 to 900%, about 350 to 800%, about 400 to 1000%, about 400 to 900%, about 400 to 800%, about 450 to 1000%, about 350 to 900%, about 350 to 800%. The method for measuring the tensile rupture elongation in an environment at each temperature is as follows. The tensile rupture elongation is satisfied preferably in at least one of MD and TD of the laminate, more preferably in both the directions.

[Measurement of Tensile Rupture Elongation of Laminate]

The tensile rupture elongation of the laminate forming the exterior material is measured with a tensile tester (e.g. AG-X plus (trade name) manufactured by Shimadzu Corporation) by a method as specified in JIS K 7127. The test sample width is that of a JIS-K 6251-7-type dumbbell, the gauge length is 15 mm, the tensile speed is 50 mm/min, and the test environment is that at 120° C. or 23° C. The measurement is performed in at least one of directions perpendicular to a direction along the thickness of a test sample (preferably a machine direction and a transverse direction). The average of values obtained by performing measurement three times in each of the machine direction and the transverse direction is adopted.

2. All-Solid-State Battery

The all-solid-state battery to which the exterior material 10 for an all-solid-state battery according to the present disclosure is applied is not particularly limited except that the specific exterior material 10 is used. That is, the constituents other than the solid electrolyte layer 40 and the exterior material 10 (electrodes, terminals, and the like) and the like are not particularly limited as long as they are applied to an all-solid-state battery, and may be those that are used in a known all-solid-state battery. Hereinafter, an aspect in which the exterior material 10 for an all-solid-state battery according to the present disclosure is applied to an all-solid-state battery will be described in detail by taking the all-solid-state battery 70 of the present disclosure as an example.

Figure 1:
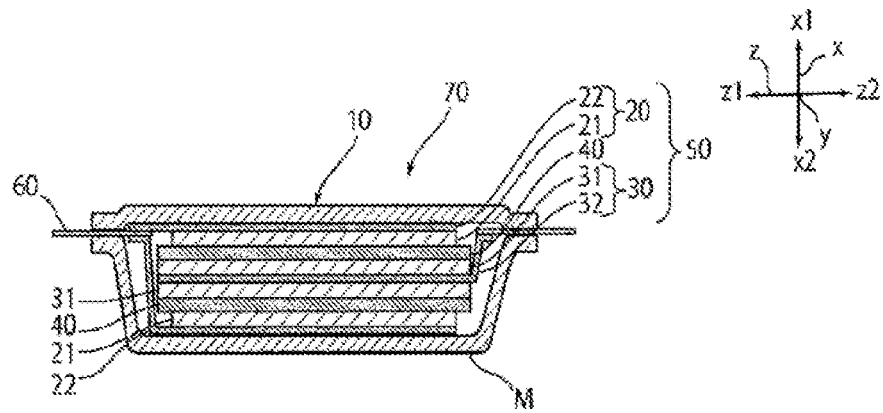
FIG. 1 is a schematic diagram showing an example of a cross-sectional structure of an all-solid-state battery to which an exterior material for an all-solid-state battery according to the present disclosure is applied.
Figure 2:
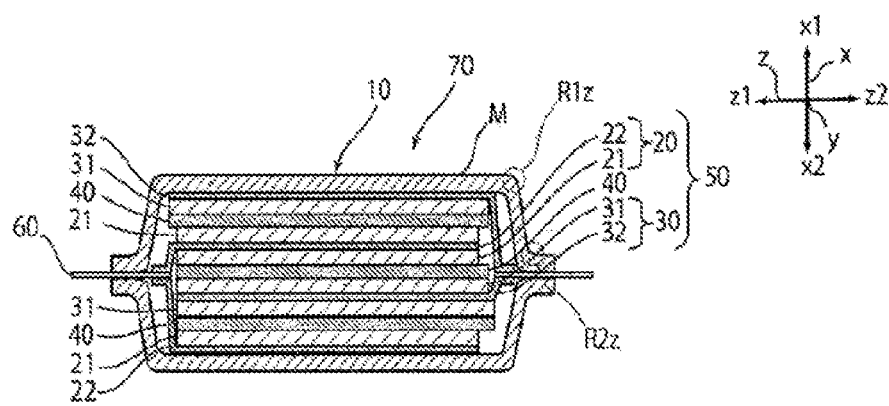
FIG. 2 is a schematic diagram showing an example of a cross-sectional structure of an all-solid-state battery to which an exterior material for an all-solid-state battery according to the present disclosure is applied.

In the all-solid-state battery 70 of the present disclosure, the solid electrolyte layer 40 is laminated between the positive electrode layer 30 and the negative electrode layer 20 and the positive electrode layer 30, the negative electrode layer 20 and the solid electrolyte layer 40 form the unit cell 50 as shown in schematic views of FIGS. 1 and 2. A battery element including at least a unit cell 50 including a positive active material layer 31, a negative active material layer 21, a positive active material layer 31, and a solid electrolyte layer 40 laminated between the positive active material layer 31 and the negative active material layer 21 is housed in a packaging formed from the exterior material 10 for an all-solid-state battery according to the present disclosure. More specifically, the positive active material layer 31 is laminated on a surface of the positive electrode current collector 32 to form the positive electrode layer 30, and the negative active material layer 21 is laminated on the negative electrode current collector 22 to form the negative electrode layer 20. The positive electrode current collector 32 and the negative electrode current collector 22 are each bonded to a terminal 60 exposed to the outside and electrically connected to the external environment. The solid electrolyte layer 40 is laminated between the positive electrode layer 30 and the negative electrode layer 20, and the positive electrode layer 30, the negative electrode layer 20 and the solid electrolyte layer 40 form the unit cell 50. The battery element of the all-solid-state battery 70 may include only one unit cell 50 or may include a plurality of unit cells 50. FIG. 1 shows the all-solid-state battery 70 including two unit cells 50 as a battery element, and FIG. 2 shows the all-solid-state battery 70 in which three unit cells 50 are laminated to form a battery element.

In the all-solid-state battery 70, the battery element is covered such that a flange portion (region where heat-sealable resin layers 4 are in contact with each other) can be formed on the periphery of the battery element while the terminal 60 connected to each of the positive electrode layer 30 and the negative electrode layer 20 protrudes to the outside, and the heat-sealable resin layers 4 at the flange portion are heat-sealed to each other, thereby providing an all-solid-state battery including an exterior material for an all-solid-state battery. When a battery element is housed in a packaging formed from the exterior material 10 for an all-solid-state battery according to the present disclosure, the packaging is formed in such a manner that the heat-sealable resin portion of the exterior material 10 for an all-solid-state battery according to the present disclosure is on the inner side (a surface contacting the battery element).

As described above, the all-solid-state battery to which the exterior material 10 according to the present disclosure is applied is not particularly limited as long as a solid electrolyte is contained and a specific exterior material 10 is used, and the same applies to the all-solid-state battery 70 according to the present disclosure. Hereinafter, materials and the like of members forming the battery element of the all-solid-state battery to which the exterior material 10 of the present disclosure is applied will be exemplified.

In the battery element of the all-solid-state battery 70, at least the positive electrode layer 30, the negative electrode layer 20 and the solid electrolyte layer 40 form the unit cell 50 as described above. The positive electrode layer 30 has a structure in which the positive active material layer 31 is laminated on the positive electrode current collector 32. The negative electrode layer 20 has a structure in which the negative active material layer 21 is laminated on the negative electrode current collector 22. The positive electrode current collector 32 and the negative electrode current collector 22 are each bonded to a terminal 60 exposed to the outside and electrically connected to the external environment.

[Positive Active Material Layer 31]

The positive active material layer 31 is a layer containing at least a positive active material. If necessary, the positive active material layer 31 may further contain a solid electrolyte material, a conductive material, a binding material and the like in addition to the positive active material.

The positive active material is not particularly limited, and examples thereof include oxide active materials and sulfide active materials. When the all-solid-state battery is an all-solid-state lithium battery, examples of the oxide active material used as the positive active material include rock salt layered active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $Li(Ni_{0.5}Mn_{1.5})O_4$, olivine type active materials such as $LiFePO_4$ and $LiMnPO_4$, and Si-containing active materials such as $Li_2FeSiO_4$ and $Li_2MnSiO_4$. In addition, examples of the sulfide active material used as the positive active material of the all-solid-state lithium battery include copper shredder, iron sulfide, cobalt sulfide and nickel sulfide.

The shape of the positive active material is not particularly limited, and examples thereof include a particle shape. Preferably, the mean particle size ($D_{50}$) of the positive active material is, for example, about 0.1 to 50 μm. The content of the positive active material in the positive active material layer 31 is preferably about 10 to 99 mass %, more preferably about 20 to 90 mass %.

Preferably, the positive active material layer 31 further contains a solid electrolyte material. This enables improvement of ion conductivity in the positive active material layer 31. The solid electrolyte material contained in the positive active material layer 31 is the same as the solid electrolyte material exemplified for the solid electrolyte layer 40 described later. The content of the solid electrolyte material in the positive active material layer is preferably about 1 to 90 mass %, more preferably about 10 to 80 mass %.

The positive active material layer 31 may further contain a conductive material. Addition of a conductive material enables improvement of the electron conductivity of the positive active material layer. Examples of the conductive material include acetylene black, Ketjen black and carbon fiber. The positive active material layer may further contain a binding material. Examples of the binding material include fluorine-containing binding materials such as polytetrafluoroethylene (PTFE) and polyvinylidene fluoride (PVDF).

The thickness of the positive active material layer 31 is appropriately set according to the size and the like of the all-solid-state battery, and is preferably about 0.1 to 1000 μm.

[Positive Electrode Current Collector 32]

Examples of the material forming the positive electrode current collector 32 include stainless steel (SUS), aluminum, nickel, iron, titanium and carbon.

The thickness of the positive electrode current collector 32 is appropriately set according to the size and the like of the all-solid-state battery, and is preferably about 10 to 1,000 µm.

[Negative Active Material Layer 21]

The negative active material layer 21 is a layer containing at least a negative active material. If necessary, the negative active material layer 21 may contain a solid electrolyte material, a conductive material, a binding material and the like in addition to the negative active material.

The negative active material is not particularly limited, and examples thereof include carbon active materials, metal active materials and oxide active materials. Examples of the carbon active material include graphite such as mesocarbon microbeads (MCMB) and highly oriented graphite (HOPG), and amorphous carbon such as hard carbon and soft carbon. Examples of the metal active material include In, Al, Si, and Sn. Examples of the oxide active material include $Nb_2O_5$, $Li_4Ti_5O_{12}$ and SiO.

The shape of the negative active material is not particularly limited, and examples thereof include a particle shape and a film shape. The mean particle size ($D_{50}$) of the negative active material is preferably about 0.1 to 50 µm. The content of the negative active material in the negative active material layer 21 is, for example, about 10 to 99 mass %, more preferably about 20 to 90 mass %.

Preferably, the negative active material layer 21 further contains a solid electrolyte material. This enables improvement of ion conductivity in the negative active material layer 21. The solid electrolyte material contained in the negative active material layer 21 is the same as the solid electrolyte material exemplified for the solid electrolyte layer 40 described later. The content of the solid electrolyte material in the negative active material layer 21 is preferably about 1 to 90 mass %, more preferably about 10 to 80 mass %.

The negative active material layer 21 may further contain a conductive material. The negative active material layer 21 may further contain a binding material. The conductive material and the binding material are the same as those exemplified for the positive active material layer 31 described above.

The thickness of the negative active material layer 21 is appropriately set according to the size and the like of the all-solid-state battery, and is preferably about 0.1 to 1000 µm.

[Negative Electrode Current Collector 22]

Examples of the material forming the negative electrode current collector 22 include stainless steel (SUS), copper, nickel, and carbon.

The thickness of the negative electrode current collector 22 is appropriately set according to the size and the like of the all-solid-state battery, and is preferably about 10 to 1,000 µm.

[Solid Electrolyte Layer 40]

The solid electrolyte layer 40 is a layer containing a solid electrolyte material. Examples of the solid electrolyte material include sulfide solid electrolyte materials and oxide solid electrolyte materials.

Sulfide solid electrolyte materials are preferable because many of the sulfide solid electrolyte materials have higher ion conductivity over oxide solid electrolyte materials, and oxide solid electrolyte materials are preferable because they have higher chemical stability over sulfide solid electrolyte materials.

Specific examples of the oxide solid electrolyte material include compounds having a NASICON-type structure. Examples of the compound having a NASICON-type structure include a compound represented by the general formula $Li_{1+x}Al_xGe_{2-x}(PO_4)_3$ ($0 \leq x \leq 2$). In particular, the compound is preferably $Li_{1.5}Al_{0.5}Ge_{1.5}(PO_4)_3$. Examples of the compound having a NASICON-type structure include a compound represented by the general formula $Li_{1+x}Al_xTi_{2-x}(PO_4)_3$ ($0 \leq x \leq 2$). In particular, the compound is preferably $Li_{1.5}Al_{0.5}Ti_{1.5}(PO_4)_3$. Examples of the oxide solid electrolyte material used for the all-solid lithium secondary battery include LiLaTiO (e.g. $Li_{0.34}La_{0.51}TiO_3$) and LiPON (e.g. $Li_{2.9}PO_{3.3}N_{0.46}$) and LiLaZrO (e.g. $Li_7La_3Zr_2O_{12}$)

Specific examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S_mP_2S_5$—ZmSn (where each of m and n is a positive number, and Z is any of Ge, Zn, and Ga), $Li_2S$—$GeS_2$, $Li_2S$—$SiS_2$—$Li_3PO_4$, and $Li_2S$—$SiS_2$—$Li_xMO_y$ (where each of x and y is a positive number, and M is any one of P, Si, Ge, B, Al, Ga, and In). Note that the above description of "$Li_2S$—$P_2S_5$" means a sulfide solid electrolyte material obtained using a raw material composition containing $Li_2S$ and $P_2S_5$, and the same applies to other descriptions. The sulfide solid electrolyte material may be sulfide glass or crystallized sulfide glass.

The content of the solid electrolyte material in the solid electrolyte layer 40 is not particularly limited, and is preferably 60 mass % or more, more preferably 70 mass % or more, still more preferably 80 mass % or more. The solid electrolyte layer may contain a binding material or may include only a solid electrolyte material.

The thickness of the solid electrolyte layer 40 is appropriately set according to the size and the like of the all-solid-state battery, and is preferably about 0.1 to 1,000 µm, more preferably about 0.1 to 300 µm.

The all-solid-state battery 70 of the present disclosure can be used in an environment of being constrained under high pressure from outside. Here, from the viewpoint of suitably suppressing delamination between the solid electrolyte and the negative active material layer (and between the solid electrolyte and the positive active material layer), the pressure for constraining the all-solid-state battery 70 from outside is preferably about 0.1 MPa or more, more preferably 5 MPa or more, still more preferably about 10 MPa or more, and preferably about 100 MPa or less, more preferably about 30 MPa or less, and the pressure is preferably in the range of about 0.1 to 100 MPa, about 0.1 to 70 MPa, about 5 to 100 MPa, about 5 to 70 MPa, about 10 to 100 MPa, or about 1 to 30 MPa.

Examples of the method for constraining the all-solid-state battery 70 under high pressure from outside include a method in which the all-solid-state battery is sandwiched between metal plates or the like, and fixed in a state of being pressed at high pressure (e.g. tightened with a vise or the like); and methods such as pressurization with gas.

From the same viewpoint, the temperature at which the all-solid-state battery 70 is constrained from outside is preferably 20° C. or higher, more preferably 40° C. or higher, and preferably 200° C. or lower, more preferably 150° C. or lower, and is preferably in the range of about 20 to 150° C.

Figure 3:
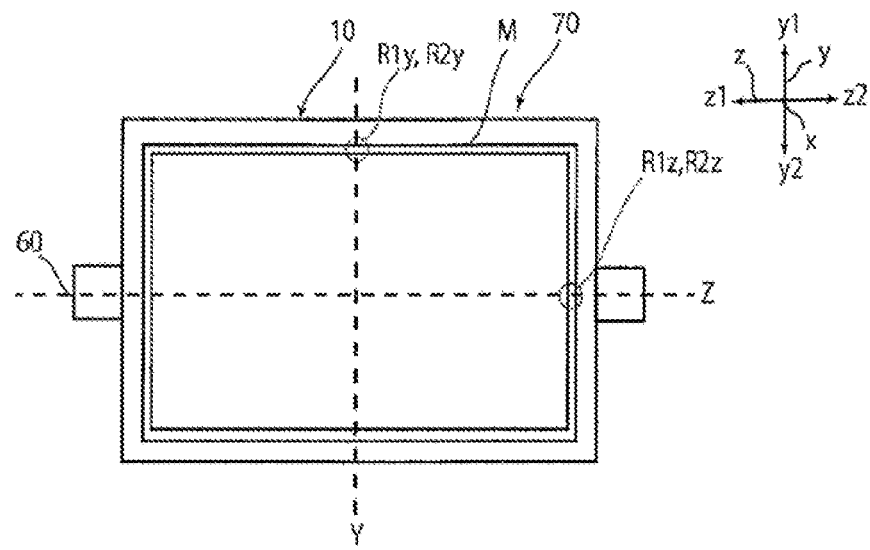
FIG. 3 is a schematic plan view of an example of an all-solid-state battery to which an exterior material for an all-solid-state battery according to the present disclosure is applied.

The shape of the all-solid-state battery 70 of the present disclosure is not particularly limited, and is preferably a rectangular shape in plan view as shown in, for example, the schematic diagram of FIG. 3. Further, the ratio of the length of the first side of the all-solid-state battery 70 having a rectangular shape in plan view to the length of the second side in a direction perpendicular to the first side (length of first side:length of second side) is preferably about 1:1 to 1:5, more preferably about 1:1 to 1:3. If the length of the second side is excessively large relative to the first side, the R value (curvature radius) of a ridgeline (first curved portion as described later) along the second side of a molded part M tends to be excessively large because the second side is difficult to fix to a mold at the time when the exterior material 10 is molded to form the later-described molded part M.

It is preferable that in the all-solid-state battery 70 of the present disclosure, the battery element is housed in the molded part M having a rectangular shape in plan view, which is formed such that the exterior material 10 protrudes from the heat-sealable resin layer 4 side to the barrier layer 3 side as shown in the schematic diagrams of FIG. 1 to FIG. 3. FIG. 1 is a diagram in which a molded part M is formed on one side of the all-solid-state battery 70. FIG. 2 is a diagram in which a molded part M is formed on one side of the all-solid-state battery 70.

In the present disclosure, it is preferable that when viewed in a plan view from the outer surface-side of exterior material 10, the all-solid-state battery 70 includes a first curved portion R1 (see R1z in FIG. 2) and a second curved portion R2 (see R2z in FIG. 2) in this order from the center part toward the end part of the exterior material 10 is on a thickness-direction cross-section of the exterior material 10 on a straight line which is parallel to two sides parallel to each other (two sides parallel to the y direction or two sides parallel to the z direction in FIG. 1 to FIG. 3) in the rectangular molded part M and which extends through the middle between the two parallel sides (see broken line Y in the y direction and broken line Z in the z direction in FIG. 3), and the R value (curvature radius) in the first curved portion R1 is 1 mm or more. When the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed. When the exterior material 10 is molded using a mold, the molded part M including the first curved portion R1 and the second curved portion R2 is formed such that the exterior material 10 protrudes from the heat-sealable resin layer 4 side to the barrier layer 3 side. In the molded part M, the first curved portion R1 is located to protrude to the outside of the all-solid-state battery.

In the schematic view of FIG. 3, a sectional view on broken line Z corresponds to the schematic diagram of FIG. 2, and the molded part M includes the first curved portion R1z and the second curved portion R2z in this order from the center part to the end part of the exterior material 10. In the schematic view of FIG. 3, the molded part M includes the first curved portion R1y and the second curved portion R2y in this order from the center part to the end part of the exterior material 10 on the cross-section on broken line Y. The expression of first curved portion R1z means a first curved portion in the z direction. Similarly, the expression of second curved portion R2z means a second curved portion in the z direction, the expression of first curved portion R1y means a first curved portion in the y direction, and the expression of second curved portion R2y means a second curved portion in the y direction. For the first curved portion R1y, the R value (curvature radius) is preferably 1 mm or more because when the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed as in the case of the R value in the first curved portion R1.

In the present disclosure, each of the R values (curvature radii) in each of the first curved portion R1 and the second curved portion R2 is a R value (curvature radius) on a surface of the exterior material 10 on the barrier layer 3 side (i.e. a portion which is on the outer surface side of the exterior material 10 and which is surrounded by, for example, the broken line in FIG. 2).

In the all-solid-state battery of the present disclosure, it is preferable that the first side parallel to the y direction of the all-solid-state battery having a rectangular shape in plan view is a short side, the second side parallel to the z direction is a long side, and the R value (curvature radius) in the first curved portion R1z along the short side parallel to they direction in which the terminal of the all-solid-state battery having a rectangular shape in plan view is installed is larger than the R value (curvature radius) in the first curved portion R1y along the long side parallel to the z direction, in, for example, FIG. 3, for the purpose of minimizing the dead space inside the battery and increasing the volume energy density.

3. Layers Forming Exterior Material for all-Solid-State Battery

The exterior material 10 of the present disclosure includes a laminate including at least the base material layer 1, the barrier layer 3 and the heat-sealable resin layer 4 in this order from outside. Hereinafter, the layers forming the exterior material 10 of the present disclosure will be described in detail.

[Base Material Layer 1]

In the present disclosure, the base material layer 1 is a layer provided outside the barrier layer 3 (outer the barrier layer protective film 3b when the barrier layer protective film 3b described later is present) for the purpose of, for example, exhibiting a function as a base material of the exterior material 10. The base material layer 1 is located on the outer layer side of the exterior material 10.

The material that forms the base material layer 1 is not particularly limited as long as it has a function as a base material, i.e. at least insulation quality. The base material layer 1 can be formed using, for example, a resin, and the resin may contain additives described later.

For formation of the base material layer 1, for example, a resin film formed of a resin may be used, or a resin may be applied to obtain a resin film in formation of the base material layer 1. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate, and copolyesters. Of these, polyethylene terephthalate is preferable. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 61, nylon 6T, nylon 61T and nylon 616T (I denotes isophthalic acid and T denotes terephthalic acid), and polyamides containing aromatics, such as polyamide MXD6 (polymethaxylylene adipamide); alicyclic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1. When the base material layer 1 is a single layer, it is preferable that the base material layer 1 is composed of a single layer of polyester resin (particularly polyethylene terephthalate).

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a slipping agent, a flame retardant, an antiblocking agent, an antioxidant, a light stabilizer, a tackifier and an antistatic agent may be present on at least one of the surface of the base material layer 1 and/or inside the base material layer 1. The additives may be used alone, or may be used in combination of two or more thereof.

In the present disclosure, it is preferable that a slipping agent is present on the surface of the base material layer 1 from the viewpoint of enhancing the moldability of the exterior material 10. The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide, and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide, and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide, and N,N'-dioleylsebacic acid amide. Specific examples of the fatty acid ester amide include stearoamide-ethyl stearate. Specific examples of the aromatic bisamide include m-xylylenebisstearic acid amide, m-xylylenebishydroxystearic acid amide, and N,N'-distearylisophthalic acid amide. The slipping agents may be used alone, or may be used in combination of two or more thereof.

When the slipping agent is present on the surface of the base material layer 1, the amount of the slipping agent present is not particularly limited, and is preferably about 3 mg/m$^2$ or more, more preferably about 4 to 15 mg/m$^2$, still more preferably about 5 to 14 mg/m$^2$.

The slipping agent present on the surface of the base material layer 1 may be one obtained by exuding the slipping agent contained in the resin forming the base material layer 1, or one obtained by applying the slipping agent to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is preferably about 2 to 25 μm.

[Adhesive Agent Layer 2]

In the exterior material 10, the adhesive agent layer 2 is a layer provided between the base material layer 1 and the barrier layer 3 if necessary for the purpose of improving bondability between these layers (bondability between the base material layer 1 and the barrier layer protective film 3b when the barrier layer protective film 3b is present).

The adhesive agent layer 2 is formed from an adhesive capable of bonding the base material layer 1 and the barrier layer 3 (or barrier layer protective film 3b). The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a first agent containing a polyol compound and a second agent containing an isocyanate compound. The polyurethane adhesive is preferably a two-liquid curable polyurethane adhesive having polyol such as polyester polyol, polyether polyol or acrylic polyol as a first agent, and aromatic or aliphatic polyisocyanate as a second agent. Preferably, polyester polyol having a hydroxyl group in the side chain in addition to a hydroxyl group at the end of the repeating unit is used as the polyol compound.

Other components may be added to the adhesive agent layer 2 as long as bondability is not inhibited, and the adhesive agent layer 2 may contain a colorant, a thermoplastic elastomer, a tackifier, a filler, and the like. When the adhesive agent layer 2 contains a colorant, the exterior material 10 can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinone-perylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material 10.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the exterior material 10 is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more, and about 10 μm or less, or about 5 μm or less, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 (or the barrier layer protective film 3b) if necessary (not shown). When the adhesive agent layer 2 is present, the colored layer may be provided between the base material layer 1 and the adhesive agent layer 2 or between the adhesive agent layer 2 and the barrier layer 3 (or the barrier layer protective film 3b). The colored layer may be provided outside the base material layer 1. By providing the colored layer, the exterior material 10 can be colored.

The colored layer can be formed by, for example, applying an ink containing a colorant to the surface of the base material layer 1, or the surface of the barrier layer 3 (the surface of the barrier layer protective film 3b when the barrier layer protective film 3b is present). As the colorant, known colorants such as pigments and dyes can be used. The colorants may be used alone, or may be used in combination of two or more thereof.

Specific examples of the colorant contained in the colored layer include the same colorants as those exemplified in the section [Adhesive Agent Layer 2].

[Barrier Layer 3]

In the exterior material 10, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the exterior material 10, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material having more excellent moldability. When the content of iron is 9.0 mass % or less, it is possible to obtain an exterior material more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing an exterior material 10 further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 μm. For example, the thickness of the barrier layer 3 is preferably about 85 μm or less, more preferably about 50 μm or less, still more preferably about 40 μm or less, especially preferably about 35 μm or less, and preferably about 10 μm or more, more preferably about 20 μm or more, still more preferably about 25 μm or more. The thickness is preferably in the range of about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, or about 25 to 35 μm. When the barrier layer 3 is formed of an aluminum alloy foil, the thickness thereof is especially preferably in the above-described range, which is about 25 to 85 μm, especially preferably about 25 to 50 μm. Particularly, when the barrier layer 3 is formed of a stainless steel foil, the thickness of the stainless steel foil is preferably about 60 μm or less, more preferably about 50 μm or less, still more preferably about 40 μm or less, even more preferably about 30 μm or less, especially preferably about 25 μm or less, and preferably about 10 μm or more, more preferably about 15 μm or more. The thickness is preferably in the range of about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, or about 15 to 25 μm.

[Barrier Layer Protective Films 3a and 3b]

In the exterior material 10, the barrier layer protective film 3a is provided on a surface of the barrier layer 3 on the heat-sealable resin layer 4 side. The exterior material 10 may include the barrier layer protective film 3a only on a surface of the barrier layer 3 on the heat-sealable resin layer 4 side, or may include the barrier layer protective films 3a and 3b on both surfaces of the barrier layer 3, respectively. It is preferable that the barrier protective film 3a is provided on a surface on the heat-sealable resin layer side in the all-solid-state battery 70 of the present disclosure. In addition, from the viewpoint of improving the adhesion of the barrier layer 3, it is preferable that barrier protective films 3a and 3b are provided on both surfaces of the barrier layer.

When the barrier layer protective film 3a in the exterior material 10 in the all-solid-state battery 70 of the present disclosure is analyzed by time-of-flight secondary ion mass spectrometry, the ratio of a peak intensity $P_{PO3}$ derived from $PO_3^-$ to a peak intensity $P_{CrPO4}$ derived from $CrPO_4^-$ ($P_{PO3/CrPO4}$) is preferably within the range of 6 to 120.

In the all-solid-state battery, the all-solid-state battery may be constrained the all-solid-state by high-pressure pressing from outside of the exterior material for suppressing delamination between the solid electrolyte and the negative active material layer or the positive active material layer. However, when the solid electrolyte, the negative active material layer or the positive active material layer are constrained in a high-pressure state from outside of the exterior material of the all-solid-state battery, there is a possibility that the heat-sealable resin layer of the exterior material is strongly pressed against the battery element, so that the thickness of the heat-sealable resin layer (inner layer) of the exterior material decreases, leading to contact between the barrier layer laminated on the exterior material and the solid electrolyte. In particular, there is a problem that if while the barrier layer of the exterior material is in contact with the solid electrolyte, an electric current passes therebetween, an alloy is generated on the surface of the barrier layer, leading to deterioration of the barrier layer. In contrast, in the all-solid-state battery 70 of the present disclosure, the barrier layer protective film 3a is provided on the surface of the barrier layer 3 of the exterior material 10 to constrain the all-solid-state battery 70 in a high-pressure state, and thus even when a current passes between the barrier layer 3 and the solid electrolyte layer 40 while the solid electrolyte extends through the heat-sealable resin layer 4 and the adhesive layer 5, an alloy is hardly generated on the surface of the barrier layer 3, so that deterioration of the barrier layer 3 is effectively suppressed. In particular, when the peak intensity ratio $P_{PO3/CrPO4}$ of the barrier layer protective film 3a is in the range of 6 to 120, generation of an alloy on the surface of the barrier layer 3 is more effectively suppressed, so that deterioration of the barrier layer 3 is further effectively suppressed.

In the present disclosure, the ratio of the peak intensity $P_{PO3}$ derived from $PO_3^-$ to the peak intensity $P_{CrPO4}$ derived from $CrPO_4^-$ ($P_{PO3/CrPO4}$) is preferably about 10 or more in terms of lower limit, and preferably about 115 or less, more preferably about 110 or less, still more preferably about 50 or less in terms of upper limit. The ratio $P_{PO3/CrPO4}$ is preferably in the range of about 6 to 120, about 6 to 115, about 6 to 110, about 6 to 50, about 10 to 120, about 10 to 115, about 10 to 110 or about 10 to 50, more preferably about 10 to 50, especially preferably in the range of about 25 to 32.

In the present disclosure, when the barrier layer protective film is analyzed by time-of-flight secondary ion mass spectrometry, the ratio of a peak intensity $P_{PO2}$ derived from $PO_2^-$ to a peak intensity $P_{CrPO4}$ derived from $CrPO_4^-$ ($P_{PO2/CrPO4}$) is preferably in the range of 7 to 70.

The ratio of the peak intensity $P_{PO2}$ derived from $PO_2^-$ to the peak intensity $P_{CrPO4}$ derived from $CrPO_4^-$ ($P_{PO2/CrPO4}$) is preferably in the range of 7 to 70, and from the viewpoint of more effectively suppressing deterioration of the barrier layer 3, the ratio $P_{PO2/CrPO4}$ is preferably about 10 or more in terms of lower limit, and preferably about 65 or less, more preferably about 50 or less in terms of upper limit. The ratio $P_{PO2/CrPO4}$ is preferably in the range of about 7 to 70, about 7 to 65, about 7 to 50, about 10 to 70, about 10 to 65 or about 10 to 50, more preferably about 10 to 50, especially preferably about 15 to 37.

In the present disclosure, when the barrier layer protective films 3a and 3b are provided on both surfaces of the barrier layer 3, the peak intensity ratio $P_{PO3/CrPO4}$ is preferably in the above range for both the barrier layer protective films 3a and 3b, and the peak intensity ratio $P_{PO2/CrPO4}$ is preferably in the above-described range.

Specifically, the method for analyzing the barrier layer protective films 3a and 3b by time-of-flight secondary ion mass spectrometry can be carried out under the following measurement conditions using a time-of-flight secondary ion mass spectrometer.

(Measurement Conditions)
  Primary ion: double charged ion ($Bi_3^{++}$) of bismuth cluster
  Primary ion accelerating voltage: 30 kV
  Mass range (m/z): 0 to 1500
  Measurement range: 100 μm×100 μm
  Number of scans: 16 scans/cycle
  Number of pixels (one side): 256 pixels
  Etching ion: Ar gas cluster ion beam (Ar-GCIB)
  Etching ion accelerating voltage: 5.0 kV Presence of chromium in the barrier layer protective film can be confirmed by X-ray photoelectron spectroscopy. Specifically, first, a layer laminated on the barrier layer (e.g. an adhesive agent layer, a heat-sealable resin layer or an adhesive layer) in the exterior material is physically delaminated. Next, the barrier layer is placed in an electric furnace at about 300° C. for about 30 minutes to remove organic components present on the surface of the barrier layer. Thereafter, the surface of the barrier layer is subjected to X-ray photoelectron spectroscopy to confirm that chromium is present.

The barrier layer protective films 3a and 3b can be formed by subjecting the surface of the barrier layer 3 to chemical conversion treatment with a treatment liquid containing a chromium compound such as chromium oxide.

Examples of the chemical conversion treatment using a treatment liquid containing a chromium compound include a method in which a chromium compound such as chromium oxide dispersed in phosphoric acid and/or a salt thereof is applied to the surface of the barrier layer 3 and baked to form a barrier layer protective film on the surface of the barrier layer 3.

The peak intensity ratio $P_{PO3/CrPO4}$ of the barrier layer protective films 3a and 3b and the peak intensity ratio $P_{PO2/CrPO4}$ can be adjusted by, for example, the composition of the treatment liquid for forming the barrier layer protective films 3a and 3b and the production conditions such as the temperature and time for baking treatment after the treatment.

The ratio of the chromium compound and phosphoric acid and/or a salt thereof in the treatment liquid containing the chromium compound is not particularly limited, and from the viewpoint of setting each of the peak intensity ratio $P_{PO3/CrPO4}$ and the peak intensity ratio $P_{PO2/CrPO4}$ within the above-described range, the ratio of phosphoric acid and/or a salt thereof to 100 parts by mass of the chromium compound is preferably about 30 to 120 parts by mass, more preferably about 40 to 110 parts by mass. As phosphoric acid and a salt thereof, for example, condensed phosphoric acid and a salt thereof can also be used.

The treatment liquid containing a chromium compound may further contain an anionic polymer and a crosslinking agent for crosslinking the anionic polymer. Examples of the anionic polymer include poly (meth)acrylic acid or salts thereof, and copolymers containing (meth)acrylic acid or a salt thereof as a main component. Examples of the crosslinking agent include a compound having any functional group selecting from an isocyanate group, a glycidyl group, a carboxyl group, and an oxazoline group and a silane coupling agent. There may be one anionic polymer and crosslinking agent, or two or more anionic polymers and crosslinking agents.

From the viewpoint of effectively suppressing deterioration of the barrier layer 3, it is preferable that the treatment liquid containing a chromium compound contains an aminated phenol polymer or an acryl-based resin. When the treatment liquid containing a chromium compound contains an aminated phenol polymer, the content of the aminated phenol polymer is preferably about 100 to 400 parts by mass, more preferably about 200 to 300 parts by mass, based on 100 parts by mass of the chromium compound. The weight average molecular weight of the aminated phenol polymer is preferably about 5,000 to 20,000. The weight average molecular weight of the aminated phenol polymer is a value obtained by performing measurement by gel permeation chromatography (GPC) under the condition of using polystyrene as a standard sample.

In addition, the acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

The weight average molecular weight of the acryl-based resin is preferably about 1,000 to 1,000,000, more preferably about 3,000 to 800,000, still more preferably about 10,000 to 800,000. As the molecular weight increases, the durability is enhanced, but the water-solubility of the acryl-based resin decreases, so that the coating solution becomes instable, leading to deterioration of production stability. Conversely, the durability is deteriorated as the molecular weight increases. In the present disclosure, high durability is obtained when the weight average molecular weight of the acryl-based resin is 1,000 or more, and good production stability the durability is obtained when the weight average molecular weight is 1,000,000 or less. In the present disclosure, the weight average molecular weight of the acryl-based resin is a value obtained by performing measurement by gel permeation chromatography (GPC) under the condition of using polystyrene as a standard sample.

The acid value of the acryl-based resin is preferably large because a larger number of COOH groups may have a higher effect of contributing to bondability, but when a salt is formed as described above, it may be impossible to indicate the amount of O—C=O bonds by the acid value, and thus it is considered that bondability can be more reliably estimated by analysis from an XPS spectrum of O—C=O bonds as in the present disclosure.

When the treatment liquid containing a chromium compound contains an acryl-based resin, the content of the acryl-based resin is preferably about 50 to 400 parts by mass, more preferably about 80 to 200 parts by mass, based on 100 parts by mass of the chromium compound.

From the same viewpoint, the chromium compound is preferably at least one of chromium fluoride (III) and chromium nitrate (III). A coordinated crosslinked structure centered on a Cr atom and a high-durability film structure of aluminum fluoride may be formed.

The solvent of the treatment liquid containing a chromium compound is not particularly limited as long as it enables dispersion of components contained in the treatment liquid and can be evaporated by subsequent heating, and water is preferable.

The solid content concentration of the chromium compound present in the treatment liquid for forming the barrier layer protective films 3a and 3b is not particularly limited, and is, for example, about 1 to 15 mass %, preferably about 7.0 to 12.0 mass %, more preferably about 8.0 to 11.0 mass %, still more preferably about 9.0 to 10.0 mass % from the viewpoint of setting each of the peak intensity ratio $P_{PO3/CrPO4}$ and the peak intensity ratio $P_{PO2/CrPO4}$ within the predetermined range to effectively suppress deterioration of the barrier layer 3.

The thickness of each of the barrier layer protective films 3a and 3b is not particularly limited, and is preferably about 1 nm to 10 μm, more preferably about 1 to 100 nm, still more preferably about 1 to 50 nm from the viewpoint of effectively suppressing deterioration of the barrier layer 3. The thickness of the barrier layer protective film can be measured by observation with a transmission electron microscope or a combination of observation with a transmission electron microscope and energy dispersive X-ray spectroscopy or electron beam energy loss spectroscopy.

From the same viewpoint, the amounts of the barrier layer protective films 3a and 3b per 1 m² of the surface of the barrier layer 3 are each preferably about 1 to 500 mg, more preferably about 1 to 100 mg, still more preferably about 1 to 50 mg.

Examples of the method for applying the treatment liquid containing a chromium compound to the surface of the barrier layer include a bar coating method, a roll coating method, a gravure coating method and an immersion method.

From the viewpoint of setting each of the peak intensity ratio $P_{PO3/CrPO4}$ and the peak intensity ratio $P_{PO2/CrPO4}$ within the predetermined range to effectively suppress the deterioration of the barrier layer 3, the heating temperature at the time of baking the treatment liquid to form the barrier layer protective film is preferably about 170 to 250° C., more preferably about 180 to 230° C., still more preferably about 190 to 220° C. From the same viewpoint, the baking time is preferably about 2 to 10 seconds, more preferably about 3 to 6 seconds.

From the viewpoint of more efficiently performing the chemical conversion treatment of the surface of the barrier layer 3, it is preferable to perform degreasing treatment by a known treatment method such as an alkali immersion method, an electrolytic cleaning method, an acid cleaning method, an electrolytic acid cleaning method or an acid activation method before the barrier layer protective films 3a and 3b are provided on the surface of the barrier layer 3.

[Heat-Sealable Resin Layer 4]

In the exterior material 10 for an all-solid-state battery according to the present disclosure, the heat-sealable resin layer 4 is a layer (sealant layer) which corresponds to an innermost layer and performs a function of hermetically sealing the battery element with the heat-sealable resin layers 4 heat-sealed to each other during construction of the all-solid-state battery. Examples of the heat-sealing method for heat-sealing the heat-sealable resin layers 4 to each other include bar sealing, hot plate sealing, rotating roll sealing, belt sealing, impulse sealing, high-frequency sealing, and ultrasonic sealing.

In the exterior material 10 for an all-solid-state battery according to the present disclosure, the heat-sealable resin layer 4 is formed of a polybutylene terephthalate film containing an elastomer. Thus, the exterior material 10 for an all-solid-state battery according to the present disclosure is excellent in insulation quality in a high-temperature environment and also has excellent followability to expansion and contraction of a solid electrolyte during charge-discharge of the all-solid-state battery due to the configuration. The polybutylene terephthalate film that contains an elastomer and forms the heat-sealable resin layer 4 may be formed into the heat-sealable resin layer 4 by laminating a polybutylene terephthalate film containing an elastomer and prepared in advance with the barrier layer 3, the adhesive layer 5 and the like, or may be formed into a film by melt-extruding a resin for forming the polybutylene terephthalate film containing an elastomer and laminated with the barrier layer 3, the adhesive layer 5 and the like.

The elastomer contained in the polybutylene terephthalate film may be one that serves to enhance the flexibility of the polybutylene terephthalate film while securing the insulation quality of the polybutylene terephthalate film in a high-temperature environment. The elastomer is preferably at least one thermoplastic elastomer selected from polyester-based elastomers, polyamide-based elastomers, polyurethane-based elastomers, polyolefin-based elastomers, polystyrene-based elastomers, polyether-based elastomers, and acryl-based elastomers, or a thermoplastic elastomer which is a copolymer of any of the foregoing elastomers. The elastomer is more preferably a thermoplastic elastomer including a block copolymer of polybutylene terephthalate and polyether, and a thermoplastic elastomer including an α-olefin copolymer of polymethylpentene. In the thermoplastic elastomer including a block copolymer of polybutylene terephthalate and polyether, examples of the polyether component include copolymers of terephthalic acid and polytetramethylene ether glycol. Specific examples of preferred polyether-based thermoplastic elastomers include polytetramethylene glycol and polyepsiloncaprolactam. In the polybutylene terephthalate film, the content of the elastomer is not particularly limited as long as the flexibility of the polybutylene terephthalate film can be enhanced while the insulation quality of the polybutylene terephthalate film in a high-temperature environment is secured, and the content of the elastomer is, for example, about 0.1 mass % or more, preferably about 0.5 mass % or more, more preferably about 1.0 mass % or more, still more preferably about 3.0 mass % or more. The content is, for example, about 10.0 mass % or less, about 8.0 mass % or less, or about 5.0 mass % or less. The content is preferably in the range of about 0.1 to 10.0 mass %, about 0.1 to 8.0 mass %, about 0.1 to 5.0 mass %, about 0.5 to 10.0 mass %, about 0.5 to 8.0 mass %, about 0.5 to 5.0 mass %, about 1.0 to 10.0 mass %, about 1.0 to 8.0 mass %, about 1.0 to 5.0 mass %, about 3.0 to 10.0 mass %, about 3.0 to 8.0 mass %, or about 3.0 to 5.0 mass %.

The heat-sealable resin layer 4 may be composed of only one layer, or may be composed of two or more layers with the same resin component or different resin components. When the heat-sealable resin layer 4 is composed of two or more layers, at least one layer is preferably formed of a polybutylene terephthalate film containing an elastomer, and the polybutylene terephthalate film containing an elastomer is preferably an innermost layer. When the heat-sealable resin layer 4 is formed from two or more layers, the layer which is not formed of a polybutylene terephthalate film containing an elastomer may be, for example, a layer formed from a polyolefin such as polypropylene or polyethylene, an acid-modified polyolefin such as acid-modified polypropylene or acid-modified polyethylene, or the like. However, since polyolefins and acid-modified polyolefins have lower insulation quality in a high-temperature environment as compared to polybutylene terephthalate, it is preferable that the heat-sealable resin layer 4 includes only a polybutylene terephthalate film containing an elastomer.

Specific examples of the polyolefin include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Of these, polypropylene is preferable. The polyolefin resin in the case of a copolymer may be a block copolymer or a random copolymer. These polyolefin-based resins may be used alone, or may be used in combination of two or more thereof. The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

From the viewpoint of further improving the insulation quality of the exterior material 10 for an all-solid-state battery in a high-temperature environment and the followability, the indentation elastic modulus of the laminate forming the exterior material from the heat-sealable resin layer 4 side (indentation elastic modulus of the polybutylene terephthalate film) is preferably about 0.3 GPa or more, more preferably about 0.4 GPa or more, still more preferably about 0.5 GPa. From the same viewpoint, the indentation elastic modulus of the polybutylene terephthalate film is preferably about 5 GPa or less, more preferably about 4 GPa or less, still more preferably about 3 GPa or less, still more preferably about 2 or less, even more preferably 1.5 or less. The indentation elastic modulus of the polybutylene terephthalate film is preferably in the range of about 0.3 to 5 GPa, about 0.3 to 4 GPa, about 0.3 to 3 GPa, about 0.3 to 2 GPa, about 0.3 to 1.5 GPa, about 0.4 to 5 GPa, about 0.4 to 4 GPa, about 0.4 to 3 GPa, about 0.4 to 2 GPa, about 0.4 to 1.5 GPa, about 0.5 to 5 GPa, about 0.5 to 4 GPa, about 0.5 to 2 GPa, or about 0.5 to 1.5 GPa. The method for measuring the indentation elastic modulus of the polybutylene terephthalate film is as follows.

[Measurement of Indentation Elastic Modulus]

The indentation elastic modulus of the polybutylene terephthalate film is measured in conformation to ISO 14577: 2015, where a method is used in which the indentation elastic modulus is measured on a surface of the laminate on the heat-sealable resin layer side in an environment at about 23° C. and about 60% RH using a load ultra-microhardness tester equipped with a Vickers indenter (quadrilateral diamond indenter with a facing angle of 136°). The measurement is performed with an indentation speed of 0.1 μm/sec, a depth of indentation of 2 μm, a holding time of 5 seconds and a drawing speed of 0.1 μm/sec. The load ultra-microhardness tester is preferably PICODENTOR HM 500 (manufactured by FISCHER INSTRUMENTS K.K.). At least five samples are measured, and the average of the measured values is taken as a value of the indentation elastic modulus under the conditions. It is desirable to use a suction board or an instantaneous adhesive for fixing the sample.

From the viewpoint of further improving the insulation quality and the followability of the exterior material 10 for an all-solid-state battery in a high-temperature environment, the tensile rupture elongation of the polybutylene terephthalate film in an environment at 120° C. is preferably about 300% or more, more preferably about 350% or more, still more preferably about 400% or more, even more preferably 580% or more in at least one of directions perpendicular to a direction along the thickness of the laminate. From the same viewpoint, the tensile rupture elongation of the polybutylene terephthalate film in an environment at 120° C. is preferably about 1000% or less, more preferably about 900% or less, still more preferably about 800% or less. The tensile rupture elongation of the polybutylene terephthalate film in an environment at 120° C. is preferably in the range of about 300 to 1000%, about 300 to 900%, about 300 to 800%, about 350 to 1000%, about 350 to 900%, about 350 to 800%, about 400 to 1000%, about 400 to 900%, about 400 to 800%, about 580 to 1000%, about 580 to 900%, or about 580 to 800%. From the same viewpoint, the tensile rupture elongation of the polybutylene terephthalate film in an environment at 23° C. is preferably about 80% or more, more preferably about 100% or more, still more preferably about 120% or more. From the same viewpoint, the tensile rupture elongation of the polybutylene terephthalate film in an environment at 120° C. is preferably about 800% or less, more preferably about 700% or less, still more preferably about 620% or less. The tensile rupture elongation of the polybutylene terephthalate film in an environment at 23° C. is preferably in the range of about 80 to 800%, about 80 to 700%, about 80 to 620%, about 100 to 800%, about 100 to 700%, about 100 to 620%, about 120 to 800%, about 120 to 700%, or about 120 to 620%. The tensile rupture elongation is satisfied preferably in at least one of MD and TD of the laminate, more preferably in both the directions because expansion and contraction of the solid electrolyte occurs in both the directions. The method for measuring the tensile rupture elongation of the polybutylene terephthalate film is as follows.

[Measurement of Tensile Rupture Elongation of Heat-Sealable Resin Layer]

The tensile rupture elongation of the polybutylene terephthalate film (PBT) is measured with a tensile tester (e.g. AG-X plus (trade name) manufactured by Shimadzu Corporation) by a method as specified in JIS K 7127. The test sample width is that of a JIS-K 6251-7-type dumbbell, the gauge length is 15 mm, the tensile speed is 50 mm/min, and the test environment is that at 120° C. or 23° C. The measurement is performed in at least one of directions perpendicular to a direction along the thickness of a test sample (preferably a machine direction and a transverse direction). The average of values obtained by performing measurement three times in each of the machine direction and the transverse direction is adopted.

The heat-sealable resin layer 4 may contain a slipping agent etc. if necessary. When the heat-sealable resin layer 4 contains a slipping agent, moldability of the exterior material 10 can be improved. The slipping agent is not particularly limited, and a known slipping agent can be used. The slipping agents may be used alone, or may be used in combination of two or more thereof.

The slipping agent is not particularly limited, and is preferably an amide-based slipping agent. Specific examples of the slipping agent include those exemplified for the base material layer 1. The slipping agents may be used alone, or may be used in combination of two or more thereof.

When a slipping agent is present on the surface of the heat-sealable resin layer 4, the amount of the slipping agent present is not particularly limited, and is preferably about 10 to 50 mg/m², more preferably about 15 to 40 mg/m² from the viewpoint of improving the moldability of the exterior material.

The slipping agent present on the surface of the heat-sealable resin layer 4 may be one obtained by exuding the slipping agent contained in the resin forming the heat-sealable resin layer 4, or one obtained by applying a slipping agent to the surface of the heat-sealable resin layer 4.

The thickness of the heat-sealable resin layer 4 is preferably 30 µm or more, more preferably 40 µm or more, still more preferably 50 µm or more, from the viewpoint of obtaining an exterior material for an all-solid-state battery which has excellent insulation quality in a high-temperature environment and excellent followability to expansion and contraction of a solid electrolyte during charge-discharge of the all-solid-state battery. The thickness of the heat-sealable resin layer 4 is, for example, about 150 µm or less, preferably about 120 µm or less, and is preferably in the range of about 30 to 150 µm, about 30 to 120 µm, about 40 to 150 µm, about 40 to 120 µm, about 50 to 150 µm, and about 50 to 120 µm.

[Adhesive Layer 5]

In the exterior material 10, the adhesive layer 5 is a layer provided between the barrier layer 3 (barrier layer protective layer 3a when the barrier layer protective layer 3a is present) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the heat-sealable resin layer 4 described above. The resin forming the adhesive layer 5 can be confirmed to contain a polyolefin backbone by an analysis method such as infrared spectroscopy, gas chromatography-mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. However, if the degree of acid modification is low, the peaks may be too small to be detected. In that case, the peaks can be analyzed by nuclear magnetic resonance spectroscopy.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining an exterior material excellent in shape stability after molding while decreasing the thickness of the exterior material 10, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer protective film 3a and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2,000, more preferably about 100 to 1,000, still more preferably about 200 to 800. In the present invention, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a first agent, and the compound having an isocyanate group, the compound having an oxazoline group, and the compound having an epoxy group each function as a second agent.

The thickness of the adhesive layer 5 is preferably about 50 μm or less, about 40 μm or less, about 30 μm or less, about 20 μm or less, or about 5 μm or less, and preferably about 0.1 μm or more or about 0.5 μm or more. The thickness is preferably in the range of about 0.1 to 50 μm, about 0.1 to 40 μm, about 0.1 to 30 μm, about 0.1 to 20 μm, about 0.1 to 5 μm, about 0.5 to 50 μm, about 0.5 to 40 μm, about 0.5 to 30 μm, about 0.5 to 20 μm or about 0.5 to 5 μm. More specifically, the thickness is preferably about 1 to 10 μm, more preferably about 1 to 5 μm in the case of the adhesive exemplified for the adhesive agent layer 2 or a cured product of an acid-modified polyolefin with a curing agent. When any of the resins exemplified for the heat-sealable resin layer 4 is used, the thickness of the adhesive layer is preferably about 2 to 50 μm, more preferably about 10 to 40 μm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the heat-sealable resin layer 4 is used, for example, extrusion molding of the heat-sealable resin layer 4 and the adhesive layer 5 can be performed.

[Surface Coating Layer 6]

The exterior material 10 may include a surface coating layer 6 on the base material layer 1 of the laminate (on a side opposite to the barrier layer 3 from the base material layer 1) if necessary for the purpose of improving at least one of designability, scratch resistance, moldability and the like. The surface coating layer 6 is a layer located on the outermost layer side of the exterior material 10 when the all-solid-state battery is constructed using the exterior material 10.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a first agent containing a polyol compound and a second agent containing an isocyanate compound. The polyurethane is preferably a two-liquid curable polyurethane adhesive having polyol such as polyester polyol, polyether polyol or acrylic polyol as a first agent, and aromatic or aliphatic polyisocyanate as a second agent. Examples of the polyurethane include polyurethane containing an isocyanate compound and a polyurethane compound obtained by reacting a polyol compound with an isocyanate compound in advance. Examples of the polyurethane include polyurethane containing a polyurethane compound and a polyurethane compound obtained by reacting a polyol compound with an isocyanate compound in advance. Examples of the polyurethane include polyurethane obtained by reacting a polyol compound with an isocyanate compound to form a polyurethane compound in advance, and reacting the polyurethane compound with moisture in the air or the like. It is preferable that polyester polyol having a hydroxyl group in the side chain in addition to a hydroxyl group at the end of the repeating unit is used as the polyol compound. Examples of the second agent include aliphatic, alicyclic, aromatic and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H 12 MDI), tolylene diisocyanate (TDI), diphenylmethane diisocyanate (MDI) and naphthalene diisocyanate (NDI). Examples of the isocyanate-based compound also include polyfunctional isocyanate-modified products of one or more of these diisocyanates can be mentioned. It is also possible to use a multimer (e.g. a trimer) as the polyisocyanate compound. Examples of the multimer include adducts, biurets, and nurates. The aliphatic isocyanate-based compound is an isocyanate having an aliphatic group and having no aromatic ring, the alicyclic isocyanate-based compound is an isocyanate having an alicyclic hydrocarbon group, and the aromatic isocyanate-based compound is an isocyanate having an aromatic ring.

If necessary, the surface coating layer 6 may contain additives such as the slipping agent, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs, and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface coating layer 6 is not particularly limited as long as the above-mentioned function as the surface coating layer 6 is performed, and it is, for example, about 0.5 to 10 μm, preferably about 1 to 5 μm.

The method for producing the exterior material 10 is not particularly limited as long as a laminate is obtained in which the layers of the exterior material 10 are laminated. Examples thereof include a method including the step of laminating at least the base material layer 1, the barrier layer 3, the barrier layer protective film 3a formed on the surface of the barrier layer 3, and the heat-sealable resin layer 4 in this order.

One example of the method for producing the exterior material 10 is as follows. First, a laminate is formed in which the base material layer 1, the adhesive agent layer 2, the barrier layer 3, and the barrier layer protective film 3a formed on the barrier layer 3 are laminated in this order (hereinafter, the laminate may be described as a "laminate A"). Specifically, the laminate A can be formed by a dry lamination method in which an adhesive to be used for formation of the adhesive agent layer 2 is applied onto the base material layer 1 or the barrier layer 3 provided with the barrier layer protective film 3a (and the barrier layer protective film 3b if necessary), using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer protective film 3a of the laminate A. When the heat-sealable resin layer 4 is laminated directly on the barrier layer protective film 3a, a resin component that forms the heat-sealable resin layer 4 may be applied onto the barrier layer protective film 3a of the laminate A by a method such as a gravure coating method or a roll coating method. When the adhesive layer 5 is provided between the barrier layer protective film 3a and the heat-sealable resin layer 4, mention is made of, for example, (1) a method in which the adhesive layer 5 and the heat-sealable resin layer 4 are co-extruded to be laminated on the barrier layer protective film 3a of the laminate A (co-extrusion lamination method); (2) a method in which the adhesive layer 5 and the heat-sealable resin layer 4 are laminated to form a laminate separately, and the laminate is laminated on the barrier layer protective film 3a of the laminate A by a thermal lamination method; (3) a method in which an adhesive for formation of the adhesive layer 5 is laminated on the barrier layer protective film 3a of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the barrier layer protective film 3a of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination).

When the surface coating layer 6 is provided, the surface coating layer 6 is laminated on a surface of the base material layer 1 on a side opposite to the barrier layer 3. The surface coating layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

A laminate including the surface coating layer 6 provided if necessary, the base material layer 1, the adhesive agent layer 2 provided if necessary, the barrier layer protective film 3b provided if necessary, the barrier layer 3, the barrier layer protective film 3a provided if necessary, the adhesive layer 5 provided if necessary, and the heat-sealable resin layer 4 in this order is formed in the manner described above, and the laminate may be further subjected to a heating treatment of a hot roll contact type, a hot air type, a near-infrared type, a far-infrared type or the like for enhancing the bondability of the adhesive agent layer 2 and the adhesive layer 5 provided if necessary. As conditions for such a heating treatment, for example, the temperature is about 150 to 250° C., and the time is about 1 to 5 minutes.

The layers that form the exterior material 10 may be subjected to a surface activation treatment such as a corona treatment, a blast treatment, an oxidation treatment or an ozone treatment if necessary for improving or stabilizing film formability, lamination processing and final product secondary processing (pouching and embossing molding) suitability, and the like. For example, by subjecting at least one surface of the base material layer 1 to a corona treatment, film formability, lamination processing and final product secondary processing suitability, and the like can be improved. Further, for example, by subjecting a surface of the base material layer 1, which is opposite to the barrier layer 3, to a corona treatment, the ink printability of the surface of the base material layer 1 can be improved.

EXAMPLES

Hereinafter, the present disclosure will be described in detail by way of examples and comparative examples. However, the present disclosure is not limited to examples.

Example 1

A polyethylene terephthalate film (25 μm) was prepared as a base material layer. In addition, an aluminum alloy foil (JIS H4160: 1994 A8021 H-O (thickness: 40 μm)) was prepared as a barrier layer. Both surfaces of the aluminum foil are subjected to chemical conversion treatment as a barrier layer protective film. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking. A polybutylene terephthalate film (thickness: 50 μm) containing an elastomer (polytetramethylene glycol) at 3.5 mass % was prepared as a heat-sealable resin layer.

Using a two-liquid curable urethane adhesive (polyol compound and aromatic isocyanate compound), the base material layer and the barrier layer were bonded to each other by a dry lamination method to produce a laminate of a base material layer (25 μm), an adhesive agent layer (3 μm) and a barrier layer (40 μm). Next, using a two-liquid curable urethane adhesive (polyester polyol compound and alicyclic isocyanate compound (containing isophorone diisocyanate)), the obtained laminate on the barrier layer side and the heat-sealable resin layer were bonded to each other by a dry lamination method to laminate an adhesive layer (3 μm) and a heat-sealable resin layer (50 μm) on the barrier layer. Next, the obtained laminate was aged and heated to obtain an exterior material including a laminate in which a base material layer (polyethylene terephthalate film (25 μm)), an adhesive agent layer (cured product of two-liquid curable urethane adhesive (3 μm)), a barrier layer (aluminum alloy foil (40 μm)), an adhesive layer (cured product of two-liquid curable urethane adhesive (3 μm)) and a heat-sealable resin layer (polybutylene terephthalate film containing elastomer (50 μm)) were laminated in this order.

Example 2

Except that a polybutylene terephthalate film (thickness: 100 μm) containing an elastomer (polytetramethylene glycol) at 4 mass % was used as the heat-sealable resin layer, the same procedure as in Example 1 was carried out to obtain to obtain an exterior material including a laminate in which a base material layer (polyethylene terephthalate film (25 μm)), an adhesive agent layer (cured product of two-liquid curable urethane adhesive (3 μm)), a barrier layer (aluminum alloy foil (40 μm)), an adhesive layer (cured product of two-liquid curable urethane adhesive (3 μm)) and a heat-sealable resin layer (polybutylene terephthalate film containing elastomer (100 μm)) were laminated in this order.

Example 3

Except that a polybutylene terephthalate film (thickness: 50 μm) containing an elastomer (polytetramethylene glycol) at 2 mass % was used as the heat-sealable resin layer, the same procedure as in Example 1 was carried out to obtain an exterior material including a laminate in which a base material layer (polyethylene terephthalate film (25 μm)), an adhesive agent layer (cured product of two-liquid curable urethane adhesive (3 μm)), a barrier layer (aluminum alloy foil (40 μm)), an adhesive layer (cured product of two-liquid curable urethane adhesive (3 μm)) and a heat-sealable resin layer (polybutylene terephthalate film containing elastomer (50 μm)) were laminated in this order.

Comparative Example 1

Except that a polybutylene terephthalate film (thickness: 100 μm) free of an elastomer was used as the heat-sealable resin layer, the same procedure as in Example 1 was carried out to obtain to obtain an exterior material including a laminate in which a base material layer (polyethylene terephthalate film (25 μm)), an adhesive agent layer (cured product of two-liquid curable urethane adhesive (3 μm)), a barrier layer (aluminum alloy foil (40 μm)), an adhesive layer (cured product of two-liquid curable urethane adhesive (3 μm)) and a heat-sealable resin layer (polybutylene terephthalate film free of an elastomer (100 μm)) were laminated in this order.

Comparative Example 2

Except that an unstretched polypropylene film (thickness: 40 μm) free of an elastomer was used as the heat-sealable resin layer, the same procedure as in Example 1 was carried out to obtain to obtain an exterior material including a laminate in which a base material layer (polyethylene terephthalate film (25 μm)), an adhesive agent layer (cured product of two-liquid curable urethane adhesive (3 μm)), a barrier layer (aluminum alloy foil (40 μm)), an adhesive layer (cured product of two-liquid curable urethane adhesive (3 μm)) and a heat-sealable resin layer (unstretched polypropylene film CPP (40 μm)) were laminated in this order.

[Measurement of Elastomer Content]

The elastomer content in the polybutylene terephthalate film used in each of examples and comparative examples was measured by the following measurement method. The heat-sealable resin layer (polybutylene terephthalate film) was peeled off from the laminate forming the exterior material. The obtained polybutylene terephthalate film was cut to obtain a test sample of about 55 mg. Next, the test sample was put in a screw tube bottle, 0.5 mL of heavy chloroform and 0.5 mL of HFIP solvent were added using a micropipetter, and the test sample was sufficiently dissolved. The dissolved test sample was transferred to a NMR sample tube, and the elastomer content in the polybutylene terephthalate film was measured. The measurement apparatus and the measurement conditions are as follows.

(Measurement Apparatus and Measurement Conditions)
  Apparatus: NMR AVANCE 400 MHz, manufactured by Bruker Japan K.K.
  Probe: PA DUL 400S1 C-H-D05 Z BTO PLUS manufactured by Bruker Japan K.K.
  Measurement nucleus: 1H
  Solvent: HFIP (1,1,1,3,3,3-hexafluoro-2-propanol)/$CDCl_3$ mixed solvent
  Sample amount: 55 mg/1 mL (solvent)
  Measurement temperature: room temperature
  Number of integrations: $^1$H/64 times
  Waiting time: $^1$H/5 s
  Window function: exponential

[Measurement of Tensile Rupture Elongation of Heat-Sealable Resin Layer]

The tensile rupture elongation was measured for the polybutylene terephthalate film (PBT) and the unstretched polypropylene film (CPP) used for forming the heat-sealable resin layer. The measurement was performed using a tensile tester (AG-X plus (trade name) manufactured by Shimadzu Corporation) by a method as specified in JIS K 7127. The polybutylene terephthalate film used as a heat-sealable resin layer was used as a test sample. The test sample width is that of a JIS-K 6251-7-type dumbbell, the gauge length is 15 mm, the tensile speed is 50 mm/min, and the test environment is that at 23° C. and 120° C. The measurement is performed in each of a machine direction and a transverse direction of the test sample. The average of values obtained by performing measurement three times in each of the machine direction and the transverse direction was adopted. The results are shown in Table 1.

[Measurement of Indentation Elastic Modulus]

The laminate was cut, and the indentation elastic modulus was measured from the heat-sealing resin layer side. The indentation elastic modulus was measured in conformation to ISO 14577: 2015, where a method is used in which the indentation elastic modulus was measured on a surface of the sample in an environment at about 23° C. and about 60% RH using a load ultra-microhardness tester equipped with a Vickers indenter (quadrilateral diamond indenter with a facing angle of 136°). The measurement was performed with an indentation speed of 0.1 μm/sec, a depth of indentation of 2 μm, a holding time of 5 seconds and a drawing speed of 0.1 μm/sec. The load ultra-microhardness tester was PICODENTOR HM 500 (manufactured by FISCHER INSTRUMENTS K.K.). At least five samples were measured, and the average of the measured values was taken as a value of the indentation elastic modulus under the conditions. A suction board was used for fixing the sample. The results are shown in Table 1.

[Measurement of Tensile Rupture Elongation of Laminate]

The tensile rupture strength of the laminate forming the exterior material was measured with a tensile tester (AG-X plus (trade name) manufactured by Shimadzu Corporation) by a method as specified in JIS K 7127. The test sample width is that of a JIS-K 6251-7-type dumbbell, the gauge length is 15 mm, the tensile speed is 50 mm/min, and the test environment is that at 23° C. and 120° C. The measurement was performed in each of a machine direction and a transverse direction of the test sample. The average of values obtained by performing measurement three times in each of the machine direction and the transverse direction was adopted. The results are shown in Table 1.

[Evaluation of Insulation Quality]

Figure 7:
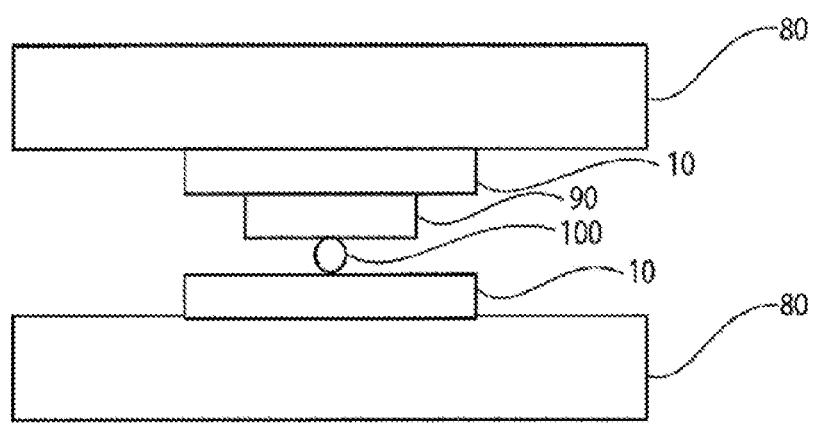
FIG. 7 is a schematic diagram for illustrating a method for evaluating insulation quality in an example.

As shown in FIG. 7, the laminate 10 for an all-solid-state battery was cut into two pieces of 30 mm square, and placed with a stainless steel plate (SUS plate) 90 of 26 mm square held therebetween so as to contact the laminate on the heat-sealable resin layer side. At this time, the laminate 10 and the SUS plate 90 were made to hold a metal wire 100 having a diameter of 25 μm therebetween, and put in an oven at 120° C. with pressure applied to 100 MPa with a constraining tool 80, and was stored for 6 hours. A cushioning material was placed between the constraining tool and the laminate so that pressure was uniformly applied. A heat and pressure test was conducted, followed by examining whether the wire was in contact with the barrier layer. As for whether or not the metal wire was in contact with the barrier layer after the heat and pressure test was conducted, the sample after the test was cut in the thickness direction using a microtome (REM-710 Retoratome manufactured by YAMATO KOKI INDUSTRIAL CO., LTD.), and the obtained cross-section was observed with a laser microscope (VK-9700 manufactured by KEYENCE CORPORATION). The evaluation criteria for insulation quality are as follows. When the barrier layer and the metal wire are in contact with each other, a short-circuit easily occurs. The results are shown in Table 1.
  A: The barrier layer and the metal wire are not in contact with each other.
  C: The barrier layer and the metal wire are not in contact with each other.

[Repeated Tension Characteristic of Laminate: Followability and Durability]

The repeated tension characteristic of the laminate forming the exterior material was evaluated. The measurement was performed using a tensile tester (AG-X plus (trade name) manufactured by Shimadzu Corporation) by a method as specified in JIS K 7127. The test sample width was that of a JIS-K 6251-7-type dumbbell, the gauge length was 15 mm, the tensile speed was 50 mm/min, and the test environment is that at 120° C. The test piece was pulled by 15 mm at 120° C., then returned to normal temperature, pulled by 20 mm at 120° C. again, and then returned to normal temperature. Further, the operation of pulling the test piece by 20 mm at 120° C. and returning the test piece to normal temperature was repeated until the test piece was broken, and followability and durability were evaluated on the basis of the number of times of pulling until breakage.

When the test piece was replaced, the distance was adjusted to a strength of 0. The results are shown in Table 1.

A large numerical value of "tensile rupture elongation/strength at elongation of 100%" shown in Table 1 means large deformation of the exterior material. If the deformation of the exterior material becomes larger, the exterior material hardly follows expansion and contraction of battery elements in repeated charge-discharge because the exterior material cannot return to its original shape. If the exterior material hardly follows expansion and contraction of the battery element, the durability of the exterior material is likely to be deteriorated.

As described above, the present disclosure provides inventions of aspects as described below.

Item 1. An exterior material for an all-solid-state battery, including a laminate including at least a base material layer, a barrier layer, and a heat-sealable resin layer in this order from outside, the heat-sealable resin layer being formed of a polybutylene terephthalate film containing an elastomer.

Item 2. The exterior material for an all-solid-state battery according to item 1, in which the elastomer contains polytetramethylene glycol.

Item 3. The exterior material for an all-solid-state battery according to item 1 or 2, in which an indentation elastic modulus of the laminate from the heat-sealable resin layer side is 0.3 GPa or more.

Item 4. The exterior material for an all-solid-state battery according to any one of items 1 to 3, in which a tensile rupture elongation of the polybutylene terephthalate film in an environment at 120° C. is 580% or more in at least one of directions perpendicular to a direction along a thickness of the laminate.

Item 5. The exterior material for an all-solid-state battery according to any one of items 1 to 4, in which a tensile rupture elongation of the laminate forming the exterior material for an all-solid-state battery in an environment at 120° C. is 300% or more in at least one of directions perpendicular to a direction along a thickness of the laminate.

TABLE 1

| | Heat-sealable resin layer | | | | | Exterior material | | | | | | |
|---|---|---|---|---|---|---|---|---|---|---|---|---|
| | | | Tensile rupture elongation (%) | | | | Tensile rupture elongation (%) | | | | Rupture strength/strength at elongation of 100% | |
| | | | 23° C. | | 120° C. | | 23° C. | | 120° C. | | 23° C. | |
| | Resin | Elastomer | MD | TD | MD | TD | MD | TD | MD | TD | MD | TD |
| Example 1 | PBT | Polytetramethylene glycol at 3.5 mass % | 655 | 580 | 610 | 767 | 470 | 350 | 380 | 650 | 1.1 | 1.0 |
| Example 2 | PBT | Polytetramethylene glycol at 4 mass % | 580 | 710 | 596 | 840 | 620 | 400 | 710 | 700 | 2.5 | 1.4 |
| Example 3 | PBT | Polytetramethylene glycol at 2 mass % | 560 | 450 | 570 | 720 | 420 | 330 | 600 | 630 | 1.0 | 1.2 |
| Comparative Example 1 | PBT | — | 480 | 380 | 560 | 700 | 400 | 300 | 450 | 600 | 1.6 | 1.6 |
| Comparative Example 2 | CPP | — | 646 | 925 | 1000< | 1000< | 450 | 400 | 1000< | 1000< | 1.6 | 1.2 |

| | Exterior material | | | | | | | |
|---|---|---|---|---|---|---|---|---|
| | Rupture strength/strength at elongation of 100% 120° C. | | Repetition durability | | | | Indentation elastic modulus | Insulation quality |
| | | | Number of times of pulling | | Ratio of change in sample length (%) | | | |
| | MD | TD | MD | TD | MD | TD | (GPa) | rating |
| Example 1 | 1.0 | 2.7 | 15 | 7 | 75 | 71 | 0.5 | A |
| Example 2 | 3.2 | 3.2 | 15 | 13 | 67 | 67 | 0.3 | A |
| Example 3 | 2.6 | 3.0 | 11 | 6 | 83 | 81 | 1 | A |
| Comparative Example 1 | 2.7 | 3.7 | 7 | 5 | 94 | 87 | 2.1 | A |
| Comparative Example 2 | Unmeasurable | Unmeasurable | 15 | 15 | 90 | 91 | 0.7 | C |

Item 6. The exterior material for an all-solid-state battery according to any one of items 1 to 5, in which the base material layer contains at least one of polyamide and polyester.

Item 7. An all-solid-state battery in which a battery element including at least a unit cell including a positive active material layer, a negative active material layer, and a solid electrolyte layer laminated between the positive active material layer and the negative active material layer is housed in a packaging formed from an exterior material for an all-solid-state battery, in which the exterior material for an all-solid-state battery includes a laminate including at least a base material layer, a barrier layer, and a heat-sealable resin layer in this order from outside, and the heat-sealable resin layer is formed of a polybutylene terephthalate film containing an elastomer.

Item 8. A method for producing an exterior material for an all-solid-state battery, the method including a step of laminating at least a base material layer, a barrier layer, and a heat-sealable resin layer in this order from outside to obtain a laminate, the heat-sealable resin layer being formed of a polybutylene terephthalate film containing an elastomer.

Item 9. A polybutylene terephthalate film for use in a heat-sealable resin layer of an exterior material for an all-solid-state battery which includes a laminate including at least a base material layer, a barrier layer, and the heat-sealable resin layer in this order from outside, the polybutylene terephthalate film containing an elastomer.

DESCRIPTION OF REFERENCE SIGNS

1: Base material layer
2: Adhesive agent layer
3: Barrier layer
3a, 3b: Barrier layer protective film
4: Heat-sealable resin layer
5: Adhesive layer
6: Surface coating layer
10: Exterior material for all-solid-state battery
20: Negative electrode layer
21: Negative active material layer
22: Negative electrode current collector
30: Positive electrode layer
31: Positive active material layer
32: Positive electrode current collector
40: Solid electrolyte layer
50: Unit cell
60: Terminal
70: All-solid-state battery
80: Constraining tool
90: Stainless steel plate
100: Metal wire

The invention claimed is:

1. An exterior material for an all-solid-state battery, comprising a laminate including at least a base material layer, a barrier layer, and a heat-sealable resin layer in this order from outside, the heat-sealable resin layer being formed of a polybutylene terephthalate film containing an elastomer, wherein the elastomer is a thermoplastic elastomer including a block copolymer of polybutylene terephthalate and polyether.

2. The exterior material for an all-solid-state battery according to claim 1, wherein the elastomer contains at least one thermoplastic elastomer selected from polyester-based elastomers, polyamide-based elastomers, polyurethane-based elastomers, polyolefin-based elastomers, polystyrene-based elastomers, and polyether-based elastomers, or a thermoplastic elastomer which is a copolymer of any of the foregoing elastomers.

3. The exterior material for an all-solid-state battery according to claim 1, wherein the elastomer contains polytetramethylene glycol.

4. The exterior material for an all-solid-state battery according to claim 1, wherein the polyether component is a copolymer of terephthalic acid and polytetramethylene ether glycol.

5. The exterior material for an all-solid-state battery according to claim 1, wherein an indentation elastic modulus of the laminate from the heat-sealable resin layer side is 0.3 GPa or more.

6. The exterior material for an all-solid-state battery according to claim 1, wherein a tensile rupture elongation of the polybutylene terephthalate film in an environment at 120° C. is 580% or more in at least one of directions perpendicular to a direction along a thickness of the laminate.

7. The exterior material for an all-solid-state battery according to claim 1, wherein a tensile rupture elongation of the laminate forming the exterior material for an all-solid-state battery in an environment at 120° C. is 300% or more in at least one of directions perpendicular to a direction along a thickness of the laminate.

8. The exterior material for an all-solid-state battery according to claim 1, wherein the base material layer contains at least one of polyamide and polyester.

9. An all-solid-state battery in which a battery element including at least a unit cell including a positive active material layer, a negative active material layer, and a solid electrolyte layer laminated between the positive active material layer and the negative active material layer is housed in a packaging formed from an exterior material for an all-solid-state battery, wherein the exterior material for an all-solid-state battery includes a laminate including at least a base material layer, a barrier layer, and a heat-sealable resin layer in this order from outside, and the heat-sealable resin layer is formed of a polybutylene terephthalate film containing an elastomer, wherein the elastomer is a thermoplastic elastomer including a block copolymer of polybutylene terephthalate and polyether.

10. A method for producing an exterior material for an all-solid-state battery, the method comprising a step of laminating at least a base material layer, a barrier layer, and a heat-sealable resin layer in this order from outside to obtain a laminate, the heat-sealable resin layer being formed of a polybutylene terephthalate film containing an elastomer, wherein the elastomer is a thermoplastic elastomer including a block copolymer of polybutylene terephthalate and polyether.

11. A polybutylene terephthalate film for use in a heat-sealable resin layer of an exterior material for an all-solid-state battery which includes a laminate including at least a base material layer, a barrier layer, and the heat-sealable resin layer in this order from outside, the polybutylene terephthalate film containing an elastomer, wherein the elastomer is a thermoplastic elastomer including a block copolymer of polybutylene terephthalate and polyether.

\* \* \* \* \*